United States Patent [19]

Fan

[11] Patent Number: 5,335,088
[45] Date of Patent: Aug. 2, 1994

[54] APPARATUS AND METHOD FOR ENCODING HALFTONE IMAGES

[75] Inventor: Zhigang Fan, Webster, N.Y.

[73] Assignee: Xerox Corporation, Stamford, Conn.

[21] Appl. No.: 861,743

[22] Filed: Apr. 1, 1992

[51] Int. Cl.$^5$ .................... G06K 9/36; H04N 11/02
[52] U.S. Cl. .................... 358/429; 358/443; 358/456; 382/50
[58] Field of Search ............ 358/37, 160, 298, 429, 358/430, 443, 455, 456, 457, 458, 459; 382/41, 50, 54, 56; 395/128

[56] References Cited

U.S. PATENT DOCUMENTS

| | | | |
|---|---|---|---|
| 4,261,018 | 4/1981 | Knowlton | 358/263 |
| 4,668,995 | 5/1987 | Chen et al. | 358/282 |
| 4,698,691 | 10/1987 | Suzuki et al. | 358/283 |
| 4,780,711 | 10/1988 | Doumas | 340/728 |
| 4,831,659 | 5/1989 | Miyaoka et al. | 382/56 |
| 4,849,810 | 7/1989 | Ericsson | 358/133 |
| 4,858,017 | 8/1989 | Torbey | 358/426 |
| 4,947,447 | 8/1990 | Miyaoka et al. | 382/56 |
| 4,975,785 | 12/1990 | Kantor | 353/447 |
| 5,196,942 | 3/1993 | Shiau | 358/298 |

Primary Examiner—Bentsu Ro
Attorney, Agent, or Firm—Gary B. Cohen

[57] ABSTRACT

In accordance with the present invention, an apparatus is provided for encoding a selected halftone pattern to provide a corresponding signal with the selected halftone pattern including a set of pixels arranged in a first block. In one aspect of the present invention, the apparatus comprises an image buffer for buffering a threshold matrix and the first block, and a device, communicating with the image buffer, for determining whether the selected halftone pattern can be formed with the threshold matrix and a single gray value. The apparatus further comprises an encoder for encoding the first block with the corresponding signal in response to a determination by the determining device that the selected halftone pattern can be formed with the threshold matrix and the single gray value.

22 Claims, 10 Drawing Sheets

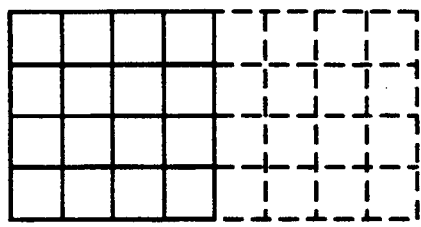
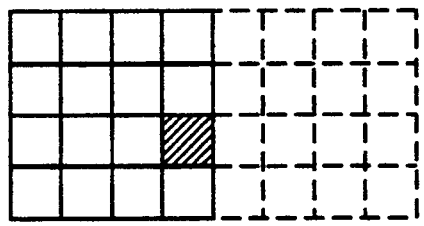
*FIG. 4A*  *FIG. 4B*
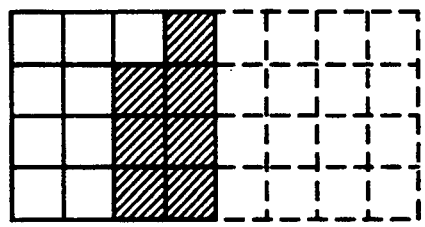
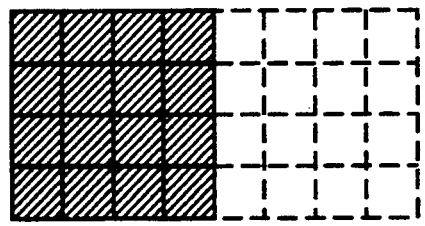
*FIG. 4C*  *FIG. 4D*
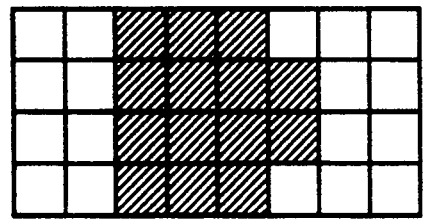
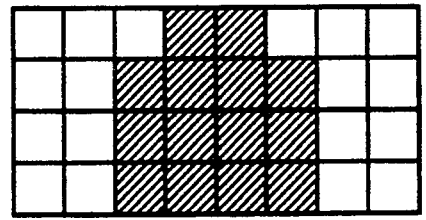
*FIG. 6A*  *FIG. 6B*
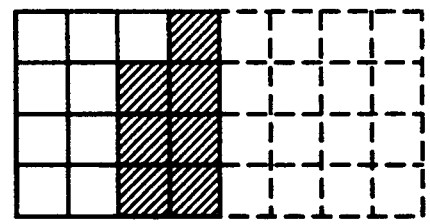
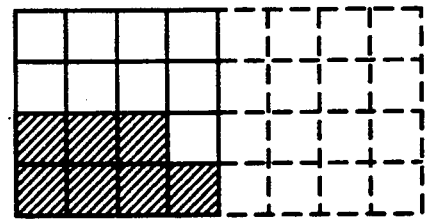
*FIG. 7A*  *FIG. 7B*

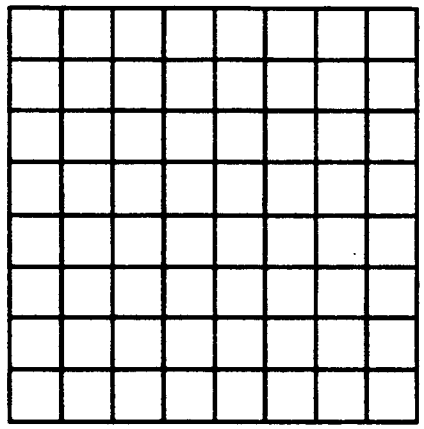
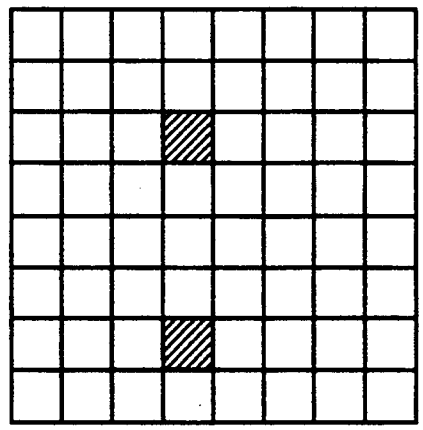
FIG. 5A  FIG. 5B
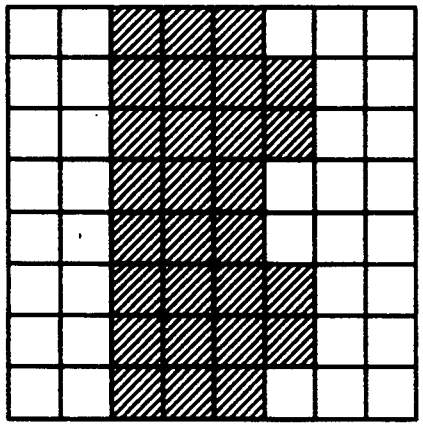
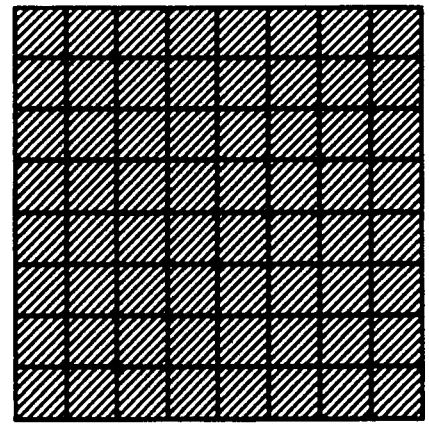
FIG. 5C  FIG. 5D

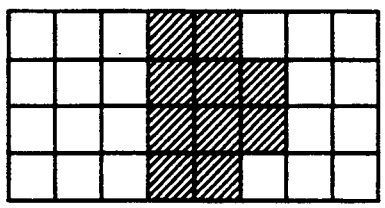
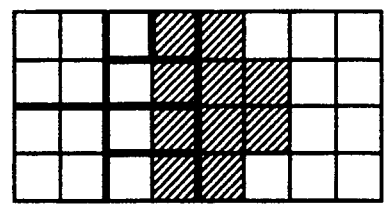
FIG. 10A     FIG. 10B
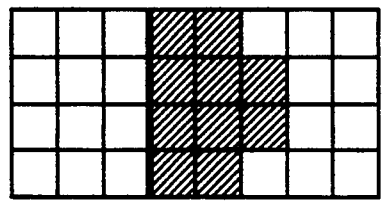
FIG. 10C
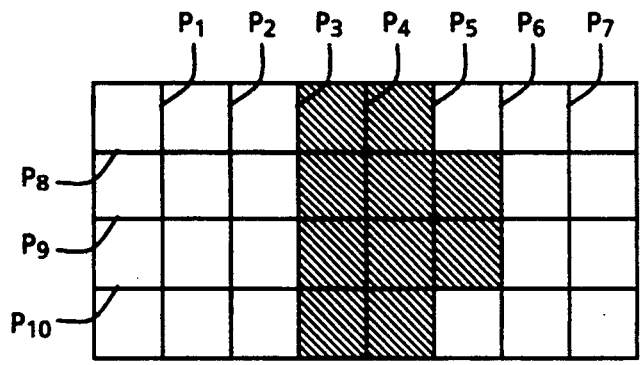
FIG. 12
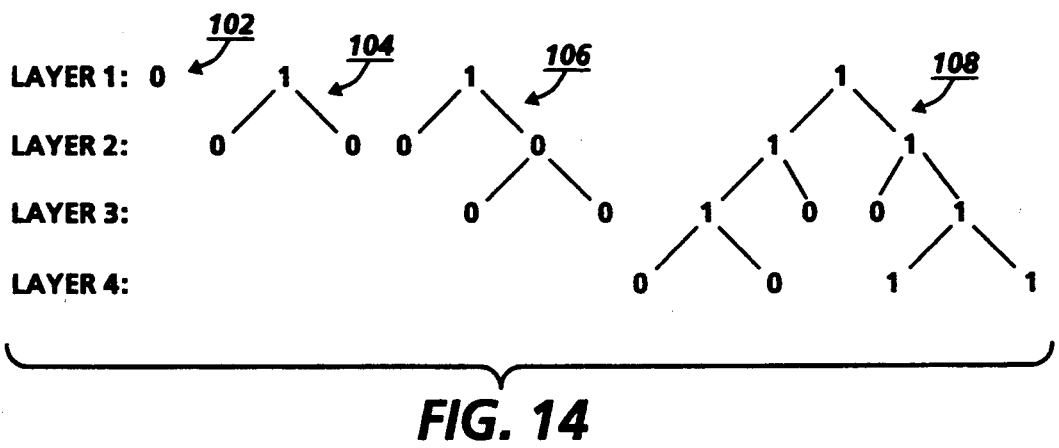
FIG. 14

APPARATUS AND METHOD FOR ENCODING HALFTONE IMAGES

The present invention relates generally to a pyramid coding scheme and more particularly to an apparatus and method for encoding image data which permits efficient compression of the image data for transmission thereof.

Data compression systems have been used to reduce the costs associated with storing and communicating image data. Relatively high levels of bit compression for digitally created (orthographic) halftones can be achieved with various known techniques. One well known technique, referred to as "run length coding" has been found to be inappropriate for compressing halftone images since it cannot suitably handle the short run lengths dominant in halftone images. A variation of run length coding, referred to as "bit interleaving," in which the image is transmitted in a rearranged bit order, has been employed, with some success, to transmit orthographic halftone images. Other techniques, which are suitable for compressing halftone images, include "tile coding" and "predictive coding." In tile coding, code words are assigned for bit patterns of a fixed size occurring in the image, and for predictive coding, the value of a pixel is predicted on the basis of previously transmitted pixel values.

Hierarchal encoding has been proposed as an alternative to conventional line-by-line image encoding techniques for the transmission of images over communication channels of restricted bandwidth. Using hierarchal encoding, data corresponding to gross approximations of an image are transmitted first, followed by data corresponding to more refined approximations, until the final image is transmitted. Therefore, the quality of the reconstructed image at the receiver is progressively improved as more image data is received.

One of the principal advantages of progressive image transmission using hierarchal encoding is the early recognition of the received image before transmission of the final image is completed. This is so because in many instances an early coarse approximation of an image is sufficient to permit identification of what is contained in the final image.

Hierarchal encoding of images is typically implemented by processing the information in an image to generate an explicit pyramidal data structure. Such a data structure contains multiple levels, each representing a successive approximation of the final image with the lowest level at the base of the pyramid representing the final image. Transmission of the pyramidal data structure begins at the highest level, i.e., at the vertex of the pyramid, followed by the transmission of successive lower levels.

The following patents relate to methods of compression, hierarchal encoding techniques, and/or methods for progressively transmitting hierarchal encoded image data:

U.S. Pat. No. 4,261,018

Patentee: Knowlton

Issued: Apr. 7, 1981

U.S. Pat. No. 4,831,659

Patentee: Miyaoka et al.

Issued: May 16, 1989

U.S. Pat. No. 4,849,810

Patentee: Ericsson

Issued: Jul. 18, 1989

U.S. Pat. No. 4,858,017

Patentee: Torbey

Issued: Aug. 15, 1989

U.S. Pat. No. 4,947,447

Patentee: Miyaoka et al.

Issued: Aug. 7, 1990

U.S. Pat. No. 4,261,018 discloses an arrangement in which a transmitter accepts a complete raster-scan binary image and processes it into nodes of a binary tree, where higher nodes correspond to larger and larger picture subdivisions, and finally sends to a remote receiver, at an available transmission rate, the information in the tree from top to bottom. At the receiver, the image is progressively developed and displayed, first in crude form as information about the larger subdivisions is received, and thereafter, progressively in finer detail as information defining lower nodes in the tree (corresponding to finer picture subdivisions) is received.

U.S. Pat. No. 4,831,659 discloses a system, including a buffer for storing data having a hierarchal structure in which: an image is divided into rectangular blocks, the blocks being non-equal in accordance with a degree of brightness change; the divided image is encoded into data formed in a tree structure so that mean distortion in each block does not exceed an allowable value; and the result is stored in the buffer.

U.S. Pat. No. 4,849,810 discloses a method for encoding interframe error data in an image transmission system to transmit a sequence of image frames employing hierarchal vector quintization and an arithmetic coding for increasing data compression of images being transmitted.

U.S. Pat. No. 4,858,017 discloses a technique for hierarchal encoding of pictorial or textual image to provide sequential image data representing progressively improved approximations of the image and for decoding of such hierarchal image data.

U.S. Pat. No. 4,947,447 discloses a method for data encoding in which image data is divided into blocks of nonequal length, each block depending on an amount of brightness variation. The brightness in each divided block is converted into data corresponding to an apex of each block. The converted data is then coded into tree-structure data.

While the above references disclose methods of compressing and transmitting blocks of binary image data, such methods are not intended for use with halftone blocks. Indeed, transmission of halftone blocks with such methods would result in a low compression rate. It would be preferable to provide a technique capable of significantly compressing blocks of halftone image data and reconstructing them into a desirable halftone image.

In accordance with the present invention, an apparatus and method is provided for encoding a selected halftone pattern to provide a corresponding signal with the selected halftone pattern including a set of pixels arranged in a first block.

In one aspect of the present invention, the apparatus comprises an image buffer for buffering a threshold matrix and the first block, and means, communicating with the image buffer, for determining whether the selected halftone pattern can be formed with the threshold matrix and a single gray value. The apparatus further comprises an encoder for encoding the first block with the signal in response to a determination by the determining means that the selected halftone pattern can be formed with the threshold matrix and the single gray value.

In another aspect of the present invention, one preferred mode of operation comprises the steps of providing a second block with a uniform halftone pattern formed from a selected threshold matrix and a single gray value, and comparing the selected halftone pattern with the uniform halftone pattern to determine whether the selected halftone pattern substantially matches the uniform halftone pattern. When the selected halftone pattern substantially matches the uniform halftone pattern, the first block is encoded with the corresponding signal.

In yet another aspect of the present invention, another preferred mode of operation comprises the steps of setting each pixel to either a first output state or a second output state, and providing each pixel with one of a plurality of distinct threshold values so that one of the pixels with the first output state has a maximum threshold value and one of the pixels with the second output state has a minimum threshold value. Preferably, the pixel with the first output state having the maximum threshold value is compared to the pixel with the second output state having the minimum threshold value, and when the pixel with the first output state having the maximum threshold value is substantially less than the pixel with the second output state having the minimum threshold value, the first block is encoded with the corresponding signal.

These and other aspects of the invention will become apparent from the following description, the description being used to illustrate a preferred embodiment of the invention when read in conjunction with the accompanying drawings.

FIGS. 4A–4D are schematic representations of 4×4 blocks of pixels, each of which defines a uniform halftone pattern;

FIGS. 5A–5D are schematic representations of 8×8 blocks of pixels, each of which defines a uniform halftone pattern;

FIGS. 6A–6B are schematic representations of 4×8 blocks of pixels, each block having a respective selected halftone pattern;

FIGS. 7A–7B are schematic representations of 4×4 blocks of pixels, the blocks having respective selected halftone patterns;

FIG. 10A is a schematic representation of a 4×8 block of pixels, the block having a selected halftone pattern;

FIG. 10B is the block of FIG. 10A partitioned with a predetermined approach;

FIG. 10C is the block of FIG. 10A partitioned with an adaptive approach;

FIG. 12 is the block of FIG. 10A with defined partitions ($P_k$);

FIG. 14 represents tree structures formed in accordance with the method of the present invention;

While the apparatus and method of the present invention will hereinafter be described in connection with preferred embodiments and methods of use thereof, it will be understood that it is not intended to limit the invention to those embodiments or methods of use. On the contrary, it is intended to cover all alternatives, modifications and equivalents as may be included within the spirit and scope of the invention as defined by the appended claims.

Figures 1, 2:
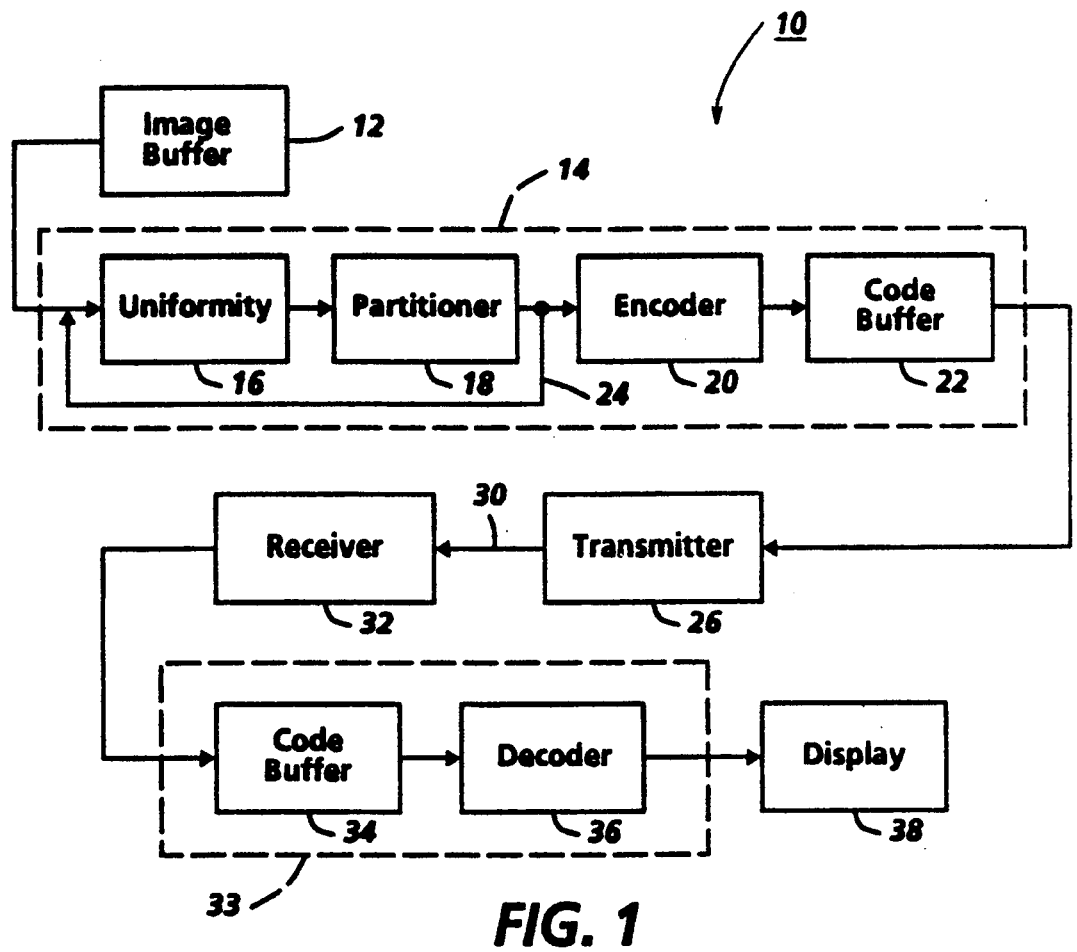
FIG. 1 is a schematic, block diagramatic representation of an apparatus capable of implementing a method of the present invention.
FIG. 2 is a schematic representation of a dot threshold matrix with thirty-two gray values.

Referring to FIG. 1, an apparatus for performing a method of the present invention is designated with the numeral 10. The apparatus 10 comprises an image buffer 12 coupled with a transmission side processor 14, the processor 14 including uniformity determining means 16, partitioning device 18, encoder 20 and code buffer 22. Image data is fed back from the partitioning device 18 to the uniformity determining device 16 by way of a feedback line 24. Output of the processor 14 is communicated to a transmitter 26, and thereby transmitted across a transmission line 30, in a known manner, to a receiver 32. In other embodiments, the transmitter 26 and the receiver 32 could respectively comprise memory sections interconnected with one another by conventional means. Image data can be communicated to a receiving side processor 33, the processor 33 including a code buffer 34 for buffering the image data and a decoder 36 for decoding the same. The decoded image data can be viewed at a conventional display 38. Components required to construct the apparatus 10 are described in further detail in U.S. Pat. No. 4,261,018 to Knowlton and in U.S. Pat. No. 4,947,447 to Miyaoka et al., the pertinent portions of which are incorporated herein by reference.

In a preferred form of operation, an image, comprising a plurality of pixels formed in halftone blocks, is stored in the image buffer 12. In the preferred embodiment, the halftone blocks are defined by binary data, but in other examples the information of each pixel could be defined in multi-bit form. It should be also understood that the halftone blocks in the image buffer 12 are preferably derived from blocks of gray level information. In particular, the gray level information is converted or thresholded into binary form by use of a dot threshold matrix. Referring to FIG. 2, a dot threshold matrix appropriate for use with a block of pixels having 33 gray levels is shown. As will be appreciated by those skilled in the art, if the halftone blocks were to contain pixels with multiple bit information, then more than one dot threshold matrix would be required to determine the gray information. Additionally, while the halftone blocks discussed herein are rectangular in shape, they could assume many different known shapes.

Each halftone block of the image buffer 12 is inputted successively to the uniformity determining device 16, which device 16 could comprise a comparator or the like. Uniformity is defined as the capacity to form a given halftone block from a given dot threshold matrix, such as the one in FIG. 2, and a single gray level. The concept of uniformity enables a uniform halftone block to be represented by a single value, namely a gray level. Accordingly, the halftone block can be compressed by transmitting this single value instead of the halftone pattern. The uniformity of a halftone block can be determined by one of at least two approaches. In the first approach, the halftone block being examined is compared with a uniform pattern. Hereinafter, discussion will be limited to examples in which the halftone block being examined is a 4×8 block of pixels derived from part or all of the dot threshold matrix of FIG. 2 and one or more gray levels. It will be understood that the dot threshold matrix could be greater or smaller in size than 4×8. Moreover, as is consistent with the relevant art, the term "dot" refers to a block of pixels having a size equal to a given dot threshold matrix and the coverage of the dot defines a "halftone period".

Figure 3C:
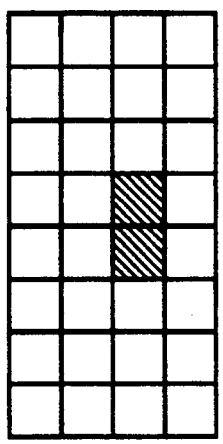
FIGS. 3A–3F are schematic representations of 4×8 blocks of pixels, each of which defines a uniform halftone pattern.
Figure 3F:
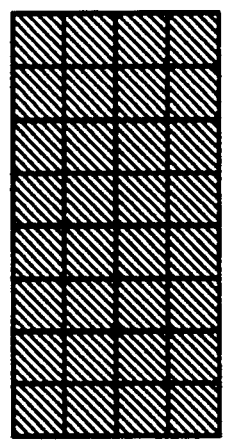
Figure 3B:
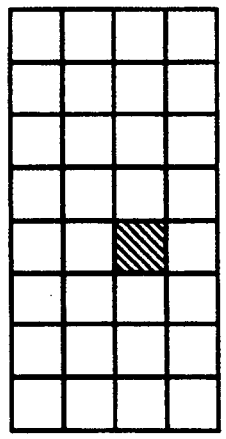
Figure 3E:
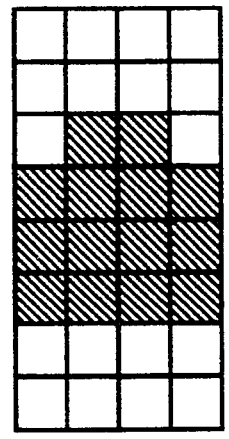
Figure 3A:
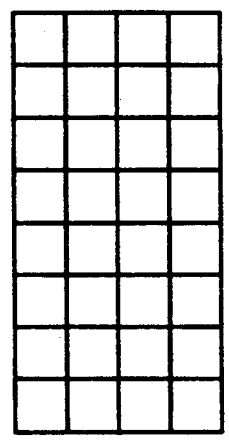
Figure 3D:
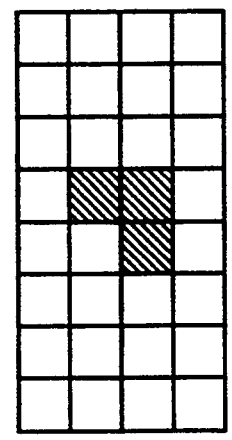

For each 4×8 halftone block derived with the dot threshold matrix of FIG. 2, there are 33 uniform patterns, i.e., 33 ways in which a halftone block can be formed with the dot threshold matrix and a single gray level value. The concept of uniformity can be easily understood by way of example. The halftone block of FIG. 3A is formed with the dot threshold matrix and the gray level of zero, the halftone block of FIG. 3B is formed with the dot threshold matrix and the gray level of one, the halftone block of FIG. 3C is formed with the dot threshold matrix and the gray level of two, and so on. FIGS. 3D–3F illustrate further examples in which sub halftone blocks were formed with the dot threshold matrix and either a gray level of three (FIG. 3D), 14 (FIG. 3E) or 32 (FIG. 3F). Stated alternatively, a given halftone block is uniform if it can be obtained by thresholding a corresponding dot threshold matrix with a single threshold value.

While FIGS. 3A–3F illustrate the case of uniformity for a block covering a halftone period, the concept of uniformity can apply to a block of any size and shape. Referring to FIGS. 4A–4D, a case in which a block covers less than the halftone period is shown. For the left half of a 4×8 halftone block, FIG. 4A would represent a uniform case in which the gray level is zero, FIG. 4B would represent a uniform case in which the gray level is one, and so on. In other examples including the left half portion of the above-referenced 4×8 halftone block, FIG. 4C would represent a uniform case in which the gray level is 12, and FIG. 4D would represent a uniform case in which the gray level is 31. Referring to FIGS. 5A–5D, a case in which a block covers more than the halftone period, is shown. For an exemplary 8×8 halftone block comprising two of the 4×8 halftone blocks, FIG. 5A would represent a uniform case in which the gray level is zero, FIG. 5B would represent a uniform case in which the gray level is one, and so on. In other examples including the 8×8 halftone block, FIG. 5C would represent a uniform case in which the gray level is 14, and FIG. 5D would represent a uniform case in which the gray level is 32. For each of the above cases, a shift in the dot threshold matrix would result in a corresponding shift in the uniform patterns. Furthermore, as will be appreciated by those skilled in the art, uniform halftone patterns of all shapes and sizes can be generated, with suitable hardware or software means, from the 33 stored patterns for the above-referenced dot.

Referring to FIGS. 6A–6B and FIGS. 7A–7B, the first preferred approach for determining uniformity is explained in further detail. When a whole halftone block is inputted to the uniformity determining device 16, it is compared to each of the uniform halftone patterns for a whole halftone block. In the present exemplary discussion, if the input to device 16 is the same as that shown in FIG. 6A, then the halftone block is designated as uniform since it matches a uniform pattern, namely the uniform pattern illustrated in FIG. 3E. If the halftone block is uniform, then it is transmitted through partitioning device 18 to the encoder 20 where it is encoded with a signal such as a "0." If, on the other hand, the input to device 16 is that of FIG. 6B, then the halftone block is designated as nonuniform since it possesses a halftone pattern that does not match the corresponding uniform halftone pattern of FIG. 3E.

As explained in further detail below, nonuniform halftone blocks are partitioned into subblocks and fed back to the uniformity determining device 16, by way of feedback line 24. Each of the subblocks formed by partitioning device 18 are inputted to the uniformity determining device 16 and compared to a uniform halftone pattern for determining whether it is uniform. In the present exemplary discussion, if the input to device 16 is the same as that shown in FIG. 7A, then the subblock is designated as uniform since it matches a uniform pattern, namely the uniform pattern illustrated in FIG. 4C. If the subblock is uniform then it is transmitted through partitioning device 18 to the encoder 20 where it is encoded with a signal, such as a "0." If, on the other hand, the input is that shown in FIG. 7B, then the subblock is designated as nonuniform since it possesses a halftone pattern that does not match the corresponding uniform halftone pattern of FIG. 4C. As will be explained in further detail below, nonuniform halftone subblocks are partitioned until only uniform subblocks remain. As will be appreciated by those skilled in the art, the above-described process could be initiated with a halftone block having a size greater than or less than the halftone period.

Figures 8A, 8B, 9A, 9B:
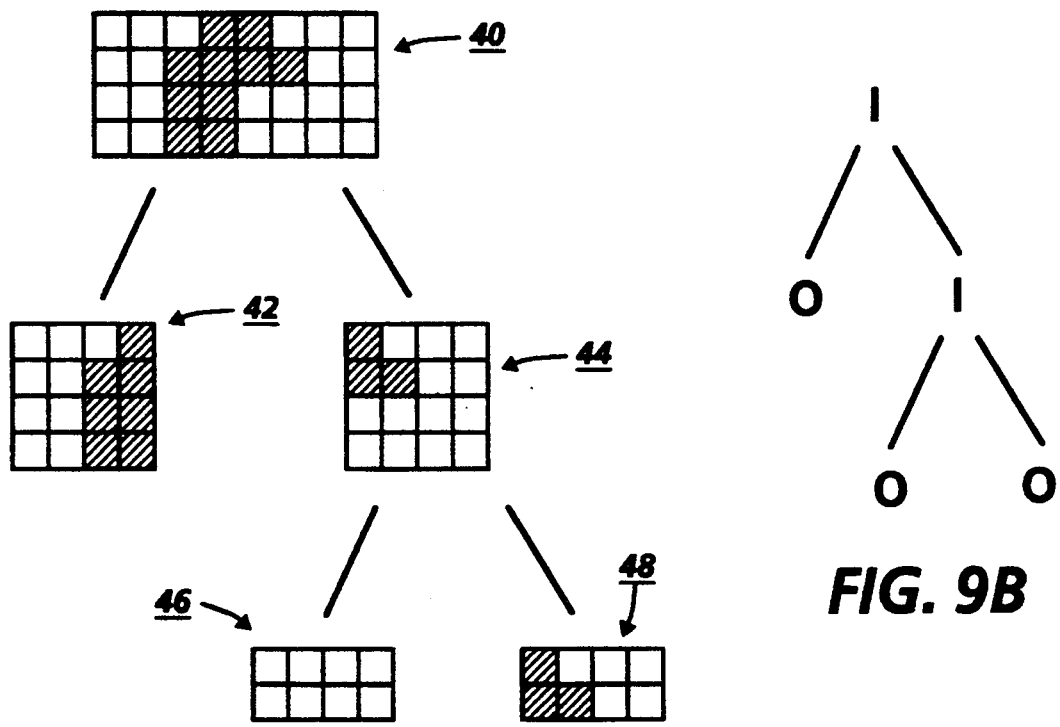
FIGS. 8A–8B are schematic representations of 4×8 blocks of pixels, the blocks having respective selected halftone patterns and the pixels having respective threshold values.
FIG. 9A is a schematic representation of a 4×8 block of pixels partitioned into subblocks in accordance with the method of the present invention.
FIG. 9B is a tree representation of the partitioned block of FIG. 9A.

In the second approach of the preferred method, information for each pixel of a given halftone block, including a distinct threshold value and either a first output state or second output state designation, is inputted to the uniformity determining device 16. The device 16 then compares the maximum threshold value of the pixels with the first output state ($B_{max}$) to the minimum threshold value of the pixels with the second output state ($W_{min}$). If $B_{max} < W_{min}$, then the halftone block is designated as uniform. Referring to FIGS. 8A and 8B, an example of the second approach is discussed. In FIG. 8A, since $B_{max} = 14$ and $W_{min} = 15$, the halftone block is uniform. In contrast, for FIG. 8B, since $B_{max} = 15$ and $W_{min} = 14$, the halftone block is nonuniform. It should be appreciated that the second approach applies to a halftone block of any size, whether it covers one or several halftone periods, or only a portion of a halftone period.

Referring to FIG. 9A, an example of the uniformity determining and partitioning steps is discussed in further detail. At the uniformity determining device 16, it can be determined, by either one of the two above-discussed approaches, that a 4×8 halftone block, designated as 40, is nonuniform. In the illustrated embodiment of FIG. 9A, the nonuniform halftone block 40 is partitioned vertically into two half halftone blocks 42,44 with the partitioning device 18. The half halftone blocks 42,44 are then fed back to the device 16, by feedback line 24, where it is determined that subblock 42 is uniform and subblock 44 is nonuniform. In turn, subblock 44 is partitioned horizontally into two quarter halftone blocks 46,48, which quarter halftone blocks 46,48 are fed back to device 16 where it is determined that they are uniform. The halftone block 40, along with its "children" 42,44,46,48 are encoded at the encoder 20 with a "0" or a "1," depending on whether they are uniform or nonuniform. Referring to FIG. 9B, the encoded information can be represented as a tree structure, and stored suitably in the code buffer 22. Various known methods can be employed to encode the tree structure of FIG. 9B. In one example, the code of the tree structure of FIG. 9B is "10100." While the processing of only one halftone block is discussed herein, it will be recognized that the process can be performed repetitively for each halftone block stored in the image buffer 12 until a plurality of trees is formed (FIG. 14) for storage in the code buffer 22. As will be discussed below, each halftone block can be transmitted either sequentially or progressively.

In the above example, partitioning was performed in a predetermined manner, but in another contemplated embodiment, partitioning could be performed adaptively. Moreover, a given halftone block or subblock can be partitioned into more than two children. The distinction between predetermined partitioning and adaptive partitioning can best be understood by way of example, the example being consistent with the the above-discussed examples employing the dot threshold matrix of FIG. 2. Referring to FIG. 10A, a nonuniform halftone block is shown. Referring to FIG. 10B, the halftone block of FIG. 10A is partitioned six times, in a predetermined manner, until all of the resulting subblocks are uniform. Upon partitioning the halftone block vertically in half, it is determined that the right side is uniform and the left side is nonuniform. The left side is then successively partitioned, and tested for uniformity until each halftone subblock is determined to be uniform. Referring to FIG. 10C, the halftone block of FIG. 10A is partitioned vertically, in an adaptive manner, between the third and fourth columns. A uniformity determination indicates that the resulting resulting halftone subblocks are uniform, so no further partitioning is required.

In reconstructing transmitted tree structures, information regarding partitioning is preferably made available on the receiving side of apparatus 10. When using predetermined partitioning information, no additional information regarding partitioning need be transmitted since the decoder 36 can be programmed to reconstruct the encoded tree structure in a way corresponding with the manner in which the halftone block was partitioned. That is, transmitted code can be reconstructed in a predetermined manner. On the other hand, when adaptive partitioning is employed, encoded information regarding the way in which each halftone block or subblock is partitioned should be transmitted.

Figure 11:
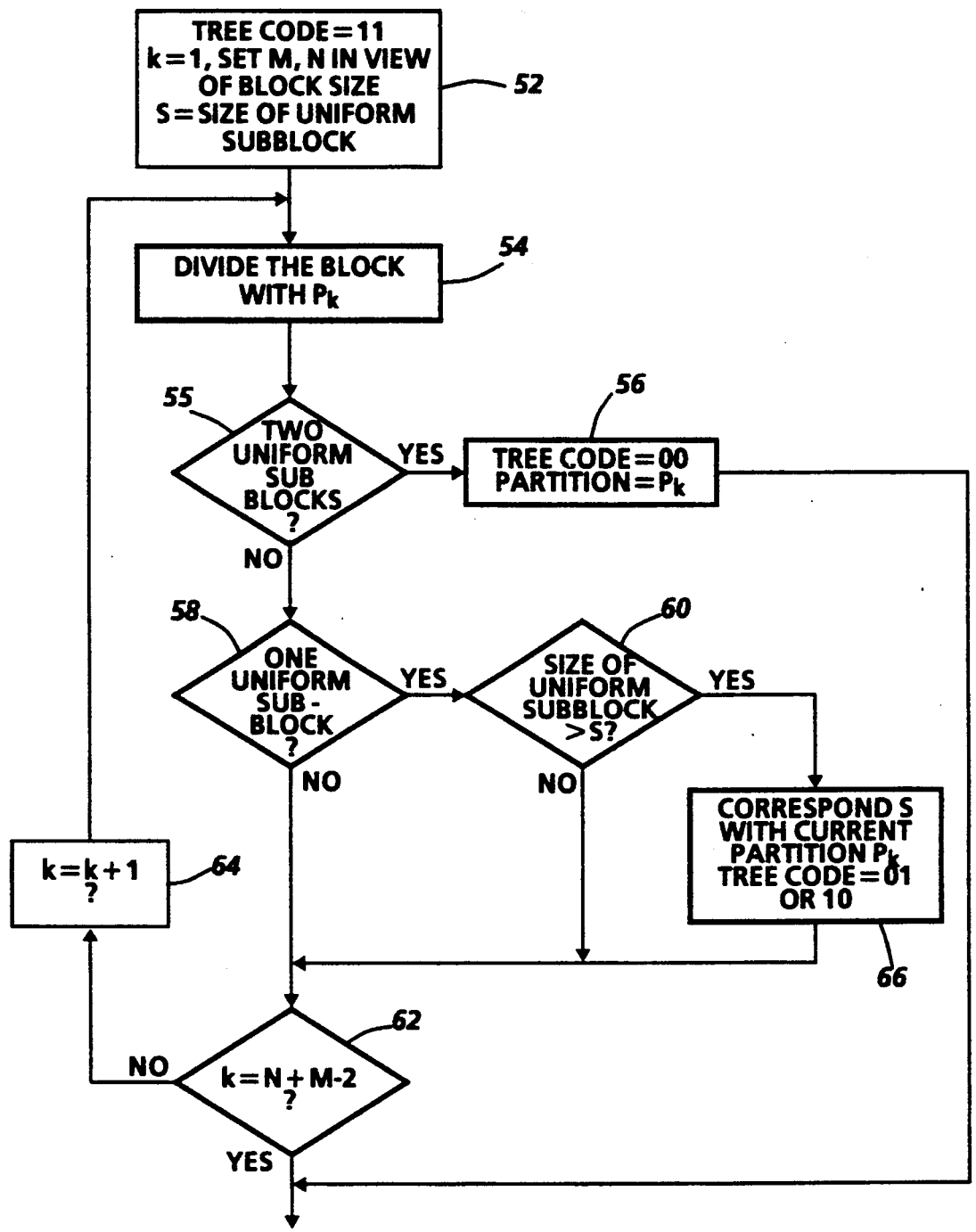
FIG. 11 is a flow diagram illustrating an adaptive approach for partitioning a halftone block.

Referring to FIGS. 11 and 12, an exemplary technique for adaptive partitioning, including a partition encoding scheme, is shown. While the technique of FIG. 11 only illustrates the partitioning of a single halftone block, it will be recognized that the concept underlying the implementation can be used to generate a tree with multiple generations of children. In the exemplary technique, the tree code for a given halftone block or subblock is set to a default tree code of 11 in an initializing step 52. Additionally, "s," which refers to the size of a uniform halftone subblock, is set to 0 and "k," which refers to an index for a partition line indicator ("$P_k$"), is set at 1. Referring to the illustrated embodiment of FIG. 12, the concept of the partition boundary ("partition") is shown. For exemplary purposes only, the partitions are restricted to either vertical or horizontal. For each m×n matrix of pixels, there are k partitions, where $k = m+n-2$. Referring again to FIG. 11, at step 54, a halftone block is divided into two parts at $P_1$, and upon examining the partitioned halftone subblocks, one of three decision paths can be followed. First, if the two halftone subblocks are uniform (step 55), the tree code is changed to 00 (step 56), the partition is suitably encoded and the encoded partition information is stored in the code buffer 34.

Second, if one of the halftone subblocks is uniform and the other is not (step 58), then the size of the uniform halftone is compared to the size of the current uniform halftone subblock (step 60) to determine if the one uniform halftone subblock is as large as possible. When the size of the uniform halftone subblock is less than the size of the current uniform halftone subblock, k is checked at step 62 and incremented at step 64, provided that k is less than $(m+n-2)$. Alternatively, when the size of the uniform halftone subblock is greater than the size of the current uniform halftone subblock, the value of s is matched with the current value of $P_k$ (step 66) and the tree code is set to 01 or 11, depending upon the orientation of the uniform and nonuniform subblocks. Subsequent to step 66, k is checked at step 62 and incremented at step 64, provided that k is less than $(n+m-2)$. Finally, if no uniform halftone subblocks are found before k reaches the value $(m+n-2)$ then the tree code 11 is stored in the code buffer 22 for the halftone block.

Referring conjunctively to FIGS. 11 and 12, an exemplary application of the adaptive partitioning technique will be discussed briefly. Initially, by use of step 54, the halftone block of FIG. 12 is divided into two parts at $P_1$. After determining that neither of the resulting halftone subblocks are uniform, k is incremented (step 64) and the process is repeated. When $k = 3$, two uniform halftone subblocks are formed so that the process is completed by suitably encoding the halftone subblocks at step 56.

Referring again to FIG. 1, after all of the appropriate information for one or more halftone blocks has been stored in the code buffer 22, an image can be transmitted, by various suitable methods, from the transmitter 26 to the receiver 32. Tree structures formed by the present inventive technique can be transmitted by one of two approaches. In the first approach, each halftone block is transmitted in sequence. With the first approach, three types of information are preferably transmitted to the receiver 32. First, information about the respective tree structure of each halftone block is provided in the form of encoded signals. For the example of FIGS. 9A and 9B, the encoded signal assumes the form 10100. Second, information about partitioning is provided, if necessary. As mentioned above, with predetermined partitioning, information about partitioning need not be transmitted. For adaptive partitioning, one or more bits of information regarding $P_k$ is preferably transmitted. It has been found that, for an m×n block of pixels, the number of bits required to transmit the adaptive partitioning information (L) corresponds with the smallest integer greater than or equal to $\log_2(m+n-2)$.

Finally, gray level information regarding each uniform halftone block or subblock is provided. Additionally, a suitable threshold matrix, which, in the present description, would comprise the dot threshold matrix of FIG. 2, is transmitted initially to or stored at the receiving side of the apparatus 10. Since the gray values among neighboring blocks are usually highly correlated, compression can be maximized by employing the encoding technique of the present invention with one or more known encoding techniques. In particular, many standard compression techniques, such as predictive coding, transform coding, entropy coding or the like can be applied in conjunction with the presently disclosed technique without major modifications.

Figure 13:
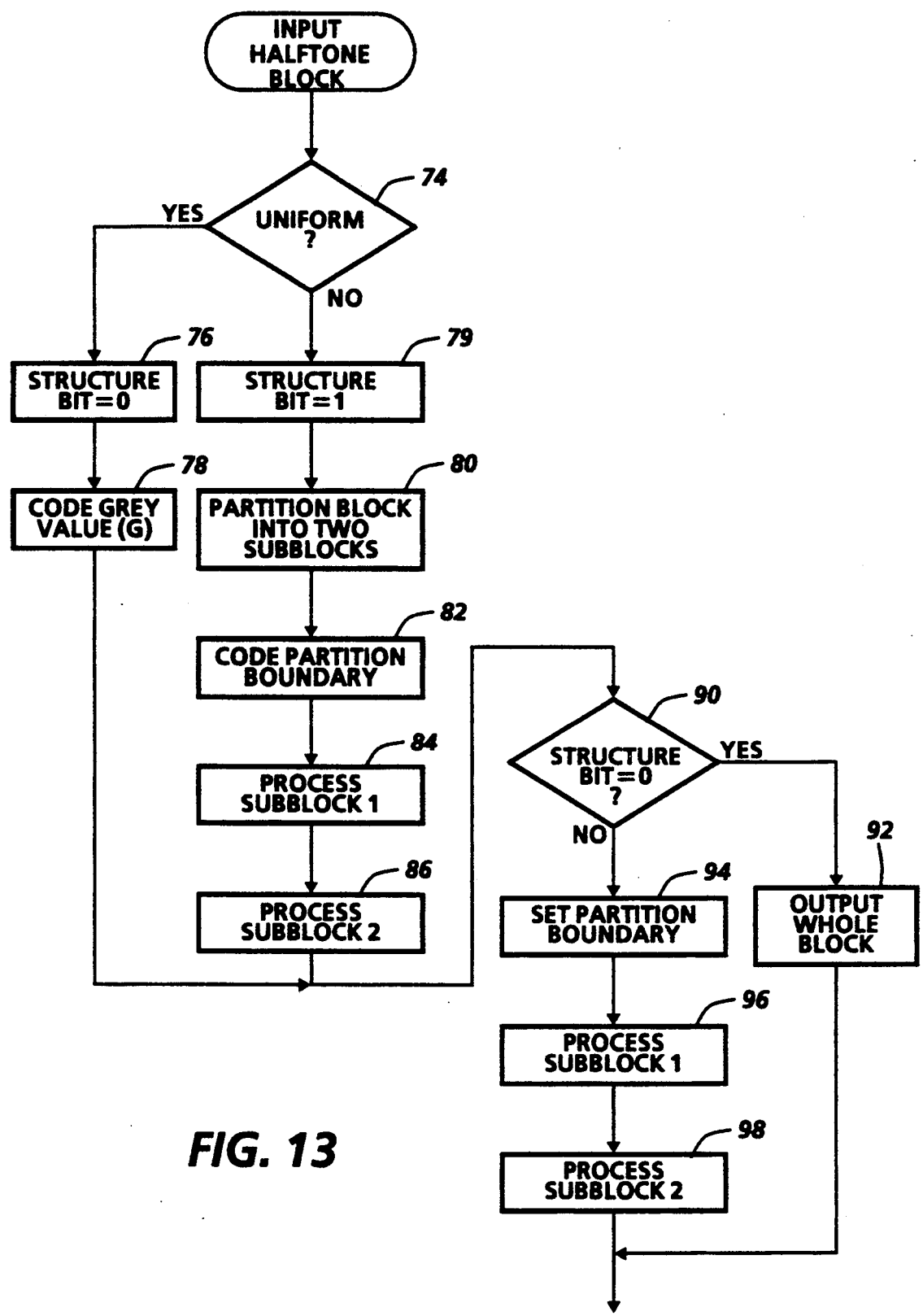
FIG. 13 represents a flow diagram for transmitting a halftone block in accordance with the method of the present invention.
Figure 15A:
FIG. 15A represents a halftone image.
Figure 15B:
FIGS. 15B–15D represent a sequence of progressive images of the halftone image of FIG. 15A developed through progressive transmission of layers from a plurality of tree structures.
Figure 15C:
Figure 15D:

Referring to FIG. 13, an exemplary technique for performing the first approach of the transmission/reconstruction scheme, is discussed. Even though the technique of FIG. 13 only shows a transmission/reconstruction scheme for one halftone block with, optionally, one generation of children, it will be appreciated by those skilled in the art that the concept underlying the exemplary technique applies to those situations in which multiple layers of halftone subblocks are to be transmitted. In the exemplary technique, there exists processing/transmission steps (FIG. 13) and reception/reconstruction steps (FIG. 13). In the processing/transmission steps, a halftone block is tested for uniformity at step 74. If the halftone block is uniform, then the halftone block is encoded with a structure bit of 0 at step 76, and provided with a gray value (g) at step 78.

On the other hand, if the halftone block is nonuniform, then it is assigned a structure bit of 1 (step 78) and partitioned at step 80 in a manner consistent with the adaptive partitioning approach. Alternatively, partitioning could be performed in a predetermined manner. Per steps 82,84,86, the halftone subblocks are assigned partition information and gray level values in a manner consistent with the methodology described above. In the reception/reconstruction steps, the structure bit is tested at step 90 and, if it has a value of one, the halftone block is outputted at step 92 using the value g and the suitable threshold matrix. Alternatively, if the structure bit has a value of 1, then the partition boundary is set at step 94, and the halftone subblocks are outputted, per steps 96 and 98, using their respective gray values.

Progressive transmission of images allows an approximate image to be built up quickly and the details of the image to be provided gradually. Referring to FIGS. 14 and 15A–15D, a scheme for progressively transmitting image data, processed in accordance with the present invention, is discussed. In the preferred embodiment, layers of tree structures are transmitted so that a refined picture can eventually be formed on the display 38. Referring to FIG. 14, four exemplary tree structures are designated with the numeral 102, 104, 106, and 108. Each tree structure comprises a single root node in its first layer while all of the other layers comprise multiple nodes. The nodes can include leaf nodes—a leaf node representing a uniform subblock to which a gray value is assigned. The tree structure 108 possesses three generations of children, representing a halftone block that has been partitioned three times, while the tree structures 102, 104 and 106 represent halftone blocks that have been partitioned zero, one, and two times, respectively.

In progressive transmission, a gray value is preferably assigned to every node instead of only to the leaf nodes. The gray value for a non-leaf node is formed as a function of the gray values of its children. In one example, such assignment for a non-leaf node can be achieved by way of averaging children. In one exemplary averaging scheme, the gray value of one the children can be determined with the gray values of the parent and child. To transmit the tree structures 102, 104, 106 and 108, the first layer of encoded signals are transmitted first, the second layer second, the third layer third, and the fourth layer last. Many of the basic principles discussed above for the process of FIG. 14 can be employed to simultaneously transmit and reconstruct each of the four blocks.

As transmission of the halftone blocks proceeds, initially, gray information regarding the top layer is received and each block is recovered as a uniform halftone pattern. Additional information is provided with the transmission of the second layer, the additional information specifying which blocks are mixed, how they should be divided, and what their gray levels should be. As explained in the discussion above of FIG. 14, a mixed block is refined as two subblocks, each of which is a part of a whole block. The transmission/reconstruction process is repeated until each subblock is uniform.

In an application of progressive transmission, a halftone image was transmitted in seven layers using a halftone block size of 16×8. Referring to FIGS. 15A–15D, an original halftone image and reconstructions of the first, second and third transmitted layers, are shown, respectively. As demonstrated by FIG. 15B, employment of the present technique permits meaningful reproduction after transmission of just the first layer.

Numerous features of the above-described invention will be appreciated by those skilled in the art. One feature of the present invention is that it permits an image to be transmitted in a highly compressed form. Moreover, the image can be reconstructed without any loss of image data.

Another feature of the present invention is that it employs an encoding scheme permitting the halftone information to be arranged conveniently in tree structures with layers. Preferably, the layers can be transmitted progressively to meet the needs of users with different requirements of image quality. For example, progressive transmission affords the user with the opportunity to begin examination of the contents of the image at an early stage of progression, and abort transmission at a selected stage of transmission.

Yet another feature of the present invention is that it contemplates the partitioning of halftone blocks in an adaptive fashion. The adaptive partitioning approach can save steps and thus considerably reduce costs of operation.

What is claimed is:

1. An apparatus for encoding a selected halftone pattern to provide a corresponding signal with the halftone pattern including a set of pixels arranged in a block, comprising:

an image buffer for buffering a threshold matrix and the block;

means, communicating with said image buffer, for determining whether the selected halftone pattern can be formed with the threshold matrix and a single gray value;

an encoder for:

encoding the block with the signal in response to a determination by said determining means that the selected halftone pattern can be formed with the threshold matrix and the single gray value, and encoding the block with a second signal in response to a determination by said determining means that the selected halftone pattern cannot be formed with the threshold matrix and the single gray value.

2. A method for encoding a selected halftone pattern to provide a corresponding first signal with the selected halftone pattern including a first set of pixels arranged in a first block, comprising the steps of:

providing a second set of pixels arranged in a second block;

providing the second block with a uniform halftone pattern formed from a selected threshold matrix and a single gray value;

comparing the selected halftone pattern with the uniform halftone pattern to determine whether the selected halftone pattern substantially matches the uniform halftone pattern;

encoding the first block with the first signal when the selected halftone pattern substantially matches the uniform halftone pattern; and encoding the first block with a second signal when the selected halftone pattern is substantially different than the uniform halftone pattern.

3. The method of claim 2, wherein the first block is substantially different than the uniform halftone pattern and said method further comprising the step of partitioning the first block into at least two subblocks with each of the subblocks being separated by a partition boundary and being characterized by a subblock halftone pattern.

4. The method of claim 3, further comprising the step of encoding the partition boundary with a partition boundary signal.

5. The method of claim 3, further comprising the steps of:

providing a third set of pixels arranged in a third block;

providing the third block with a second uniform halftone pattern, the second uniform halftone pattern being formed from a portion of the selected threshold matrix and a single gray value;

comparing each of the subblock halftone patterns with the second uniform halftone pattern to determine whether each subblock halftone pattern substantially matches the second uniform halftone pattern; and encoding each subblock whose subblock halftone pattern substantially matches the second uniform halftone pattern with a third signal.

6. The method of claim 5, further comprising the step of encoding each subblock whose subblock halftone pattern is substantially different than the second uniform halftone pattern with a fourth signal.

7. The method of claim 6, further comprising the step of transmitting one or more of the first, second, third and fourth signals to a receiver.

8. The method of claim 6, further comprising at least one step for determining whether the partition boundary can be set so that at least one of the subblock halftone patterns substantially matches the second uniform halftone pattern.

9. The method of claim 2, further comprising the steps of:

providing a second selected halftone pattern comprising a third set of pixels arranged in a third block;

providing a fourth set of pixels arranged in a fourth block, the fourth block having a second uniform halftone pattern, the second uniform halftone pattern being formed from a second selected threshold matrix and a single gray value;

comparing the second selected halftone pattern with the second uniform halftone pattern to determine whether the second selected halftone pattern substantially matches the second uniform halftone pattern; and encoding the third block with a third signal when the second selected halftone pattern substantially matches the second uniform halftone pattern encoding the third block with a fourth signal when the second selected halftone pattern is substantially different than the second uniform halftone pattern;

forming a selected one of the first and second signals into a first tree structure having a layer; and forming a selected one of the third and fourth signals into a second tree structure having a layer.

10. The method of claim 9, further comprising the step of transmitting the layers of the first and second tree structures to a receiver.

11. A method for encoding a selected halftone pattern to provide a corresponding first signal with the halftone pattern including a set of pixels arranged in a block comprising the steps of:

setting each pixel to one of a first output state and a second output state;

providing each pixel with one of a plurality of distinct threshold values, one of the pixels with the first output state having a maximum threshold value and one of the pixels with the second output state having a minimum threshold value;

comparing the pixel with the first output state having the maximum threshold value to the pixel with the second output state having the minimum threshold value; and encoding the block with the first signal when the pixel with the first output state having the maximum threshold value is substantially less than the pixel with the second output state having the minimum threshold value.

12. The method of claim 11, further comprising the step of encoding the block with a second signal when the first output state having the maximum threshold value is substantially greater than the pixel with the second output state having the minimum threshold value.

13. The method of claim 12, wherein the first output state having the maximum threshold value is substantially greater than the pixel with the second output state having the minimum threshold value, further comprising the step of partitioning the block into at least first and second subblocks with each of the first and second subblocks being separated by a partition boundary and being characterized by a subblock halftone pattern.

14. The method of claim 13, further comprising the step of encoding the partition boundary with a partition boundary signal.

15. The method of claim 13, wherein:
the first subblock comprises a pixel with a third output state having a maximum threshold value and a pixel with a fourth output state having a minimum threshold value;
the second subblock comprises a pixel with a fifth output state having a maximum threshold value and a pixel with a sixth output state having a minimum threshold value;
the first subblock is encoded with a third signal when the pixel with the third output state having the maximum threshold value is substantially less than the pixel with the fourth output state having the minimum threshold value; and
the second subblock is encoded with the third signal when the pixel with the fifth output state having the maximum threshold value is substantially less than the pixel with the sixth output state having the minimum threshold value.

16. The method of claim 15, wherein:
the first subblock is encoded with a fourth signal when the pixel with the third output state having the maximum threshold value is substantially greater than the pixel with the fourth output state having the minimum threshold value; and
the second subblock is encoded with the fourth signal when the pixel with the fifth output state having the maximum threshold value is substantially greater than the pixel with the sixth output state having the minimum threshold value.

17. The method of claim 16, further comprising the step of transmitting one or more of the first, second, third and fourth signals to a receiver.

18. The method of claim 15, further comprising at least one step for determining whether the partition boundary can be set so that at least one of the first subblock and the second subblock can be encoded with the third signal.

19. The method of claim 12, further comprising the steps of:
providing a second selected halftone pattern comprising a second set of pixels arranged in a second block;
setting each pixel of the second block to one of a third output state and a fourth output state;
providing each pixel of the second block with one of a plurality of distinct threshold values, one of the pixels with the third output state having a maximum threshold value and one of the pixels with the fourth output state having a minimum threshold value;
comparing the pixel with the third output state having the maximum threshold value to the pixel with the fourth output state having the minimum threshold value; and
encoding the second block with a third signal when the pixel with the third output state having the maximum threshold value is substantially less than the pixel with the fourth output state having the maximum threshold value;
encoding the second block with a fourth signal when the pixel with the third output state having the maximum threshold value is substantially greater than the pixel with the fourth output state having the minimum threshold value;
forming a selected one of the first and second signals into a first tree structure having a layer; and
forming a selected one of the third and fourth signals into a second tree structure having a layer.

20. The method of claim 19, further comprising the step of transmitting the layers of the first and second tree structures to a receiver.

21. An apparatus for encoding a selected halftone pattern to provide a corresponding first signal with the halftone pattern including a set of pixels arranged in a block, comprising:
an image buffer for buffering a threshold matrix and the block;
means, communicating with said image buffer, for determining whether the selected halftone pattern can be formed with the threshold matrix and a single gray value;
an encoder for encoding the block with the first signal in response to a determination by said determining means that the selected halftone pattern can be formed with the threshold matrix and the single gray value;
means for partitioning the block into at least two subblocks in response to a determination by said determining means that the selected halftone pattern cannot be formed with the threshold matrix and the single gray value wherein each of the subblocks is separated by a partition boundary and is characterized by a subblock halftone pattern, and wherein the encoder is adapted to:
encode the block with a second signal when the selected halftone pattern cannot be formed with the threshold matrix and the single gray value,
encode each subblock with a third signal when the subblock halftone pattern can be formed with part of the threshold matrix and a single gray value, and
encode each subblock with a fourth signal when the subblock halftone pattern cannot be formed with part of the threshold matrix and the single gray value.

22. The apparatus of claim 21, further comprising means for transmitting one or more of the first, second, third and fourth signal to a receiver.

* * * * *